United States Patent [19]

Frano

[11] Patent Number: 4,878,792
[45] Date of Patent: Nov. 7, 1989

[54] REMOVABLE MAT FASTENER

[75] Inventor: Frank G. Frano, Hoffman Estates, Ill.

[73] Assignee: Illinois Tool Works, Inc., Chicago, Ill.

[21] Appl. No.: 226,772

[22] Filed: Aug. 1, 1988

[51] Int. Cl.$^4$ .......................... F16B 21/00; F16B 19/00
[52] U.S. Cl. .................................... 411/339; 411/372; 411/508; 411/913; 24/615
[58] Field of Search ........ 411/372, 338, 339, 508–510, 411/908, 913; 24/141, 598, 599, 604, 615; 16/4, 6, 8

[56] References Cited

U.S. PATENT DOCUMENTS

| 3,213,494 | 10/1965 | Mayers et al. | 411/913 |
| 3,756,115 | 9/1973 | Schuplin | 411/508 |
| 4,397,061 | 8/1983 | Kanzaka | 24/141 |
| 4,406,033 | 9/1983 | Chisholm et al. | 24/615 |
| 4,664,574 | 5/1987 | Kasai | 411/508 |

FOREIGN PATENT DOCUMENTS 1520516 2/1967 France ........................ 16/4

Primary Examiner—Neill R. Wilson
Attorney, Agent, or Firm—Schwartz & Weinrieb

[57] ABSTRACT

A car-mat fastener for removably securing a car-mat to a car carpet includes a latching post member, a bottom latching ring-mat member, and a top latching ring-mat member. The top member is telescoped into the bottom member for permanently securing them together and to form an eyelet extending therethrough. The post member includes a lower projecting portion for fixed attachment to the car carpet and an upper post portion for insertion through the eyelet so as to be detachably engaged with the top and bottom latching members.

20 Claims, 2 Drawing Sheets

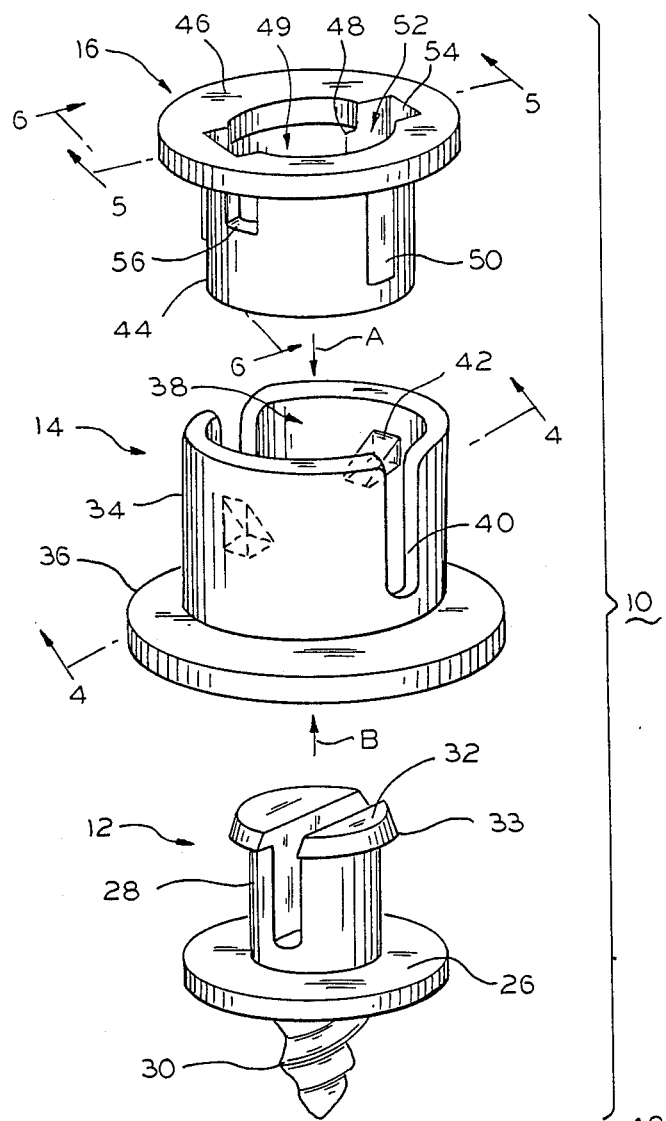
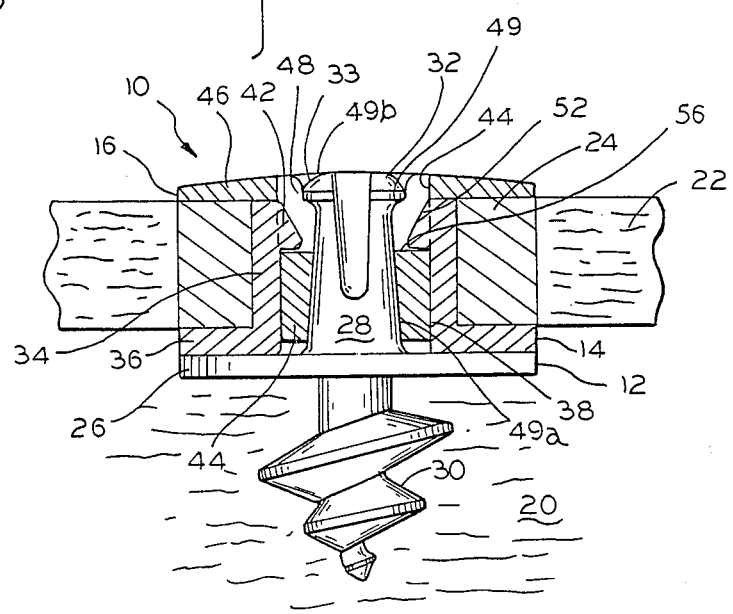
FIG.1
FIG.2

REMOVABLE MAT FASTENER

FIELD OF THE INVENTION

This invention relates generally to mechanically operable fastener devices and more particularly, it relates to a car-mat fastener for removably retaining a car-mat to a car carpet.

BACKGROUND OF THE INVENTION

There is known in the prior art a fastener device for attaching a car-mat to a car carpet which includes an upstanding top portion. The disadvantage of this prior art type of fastener is that the upstanding top portion has a generally high profile which causes interference with the car seat when it is adjusted back and forth so as to accommodate various drivers.

It would therefore be desirable to provide a car-mat fastener which has a low profile so as to avoid any interference with the car seat. Furthermore, it would be expedient to provide a car-mat fastener which can be quickly and easily installed for securing the car-mat to the car carpet, and yet permits the removal of the car-mat without the use of any tools or equipment.

OBJECTS OF THE INVENTION

Accordingly, it is a general object of the present invention to provide a removable mat fastener which is relatively simple and economical to manufacture and assemble.

It is an object of the present invention to provide a car-mat fastener for removably securing a car-mat to a car carpet which has a low profile so as to avoid any interference with the car seat.

It is another object of the present invention to provide a car-mat fastener which can be quickly and easily installed for attaching a car-mat to a car carpet, and yet permits the removal of the car-mat without the use of any tools or equipment.

It is still another object of the present invention to provide a car-mat fastener for removably attaching a car-mat to a car carpet which includes a latching post member, a bottom latching ring-mat member, and a top latching ring-mat member.

BRIEF DESCRIPTION OF THE DRAWINGS

The foregoing and other objects and advantages of the present invention will become more fully apparent from the following detailed description when read in conjunction with the accompanying drawings with like reference numerals indicating corresponding parts throughout the several views, wherein:

FIG. 1 is an exploded isometric view of a car-mat fastener constructed in accordance with the principles of the present invention;

FIG. 2 is a partial, cross-sectional view of the mated top and bottom latching ring-mat members shown with the other components of the car-mat fastener in their fully assembled condition;

DESCRIPTION OF THE PREFERRED EMBODIMENT

Figure 3:
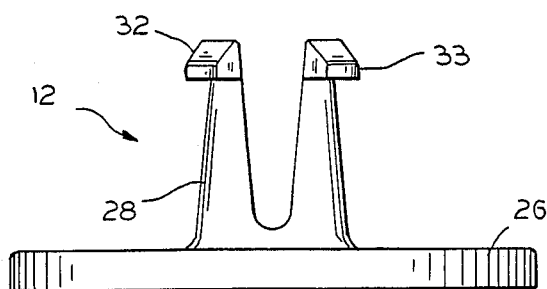
FIG. 3 is a side elevational view of the latching post member of FIG. 1.

Referring now in detail to the drawings, a car-mat fastener 10 of the present invention for removably securing a car-mat to a car carpet is illustrated in FIGS. 1 and 2. The car-mat fastener 10 is comprised of a latching post member 12, a bottom latching ring-mat member 14, and a top latching ring member 16. The latching post member 12 is adapted to be fixedly secured to a car carpet 20. As is generally known, a rectangularly-shaped car-mat 22 for use with the fastener 10 of the present invention is of the type having a grommet 24 or the like disposed in two corners of the car-mat, one of which is shown in FIG. 2. The bottom latching member 14 is received within the grommet 24 from the undersurface side of the car-mat 22, and the top latching member 16 is received within the bottom latching member 14 from the top side of the car mat. The top and bottom latching members 14 and 16 are adapted to be permanently secured together, sandwiching the car-mat 22 therebetween and forming an eyelet therethrough. Then, the post member 12 is inserted into the eyelet for releasible or detachable attachment to the top and bottom latching members.

With reference to FIGS. 1-3 of the drawings, the latching post member 12 includes a central circular flange 26 separating an upper bifurcated post portion 28 and a lower projecting portion 30. The lower projecting portion 30 defines an attachment means for fixedly securing the post member 12 to the car carpet 20. The lower projecting portion 30 is preferably formed as an auger so that the post member 12 can be easily threaded or screwed into the car carpet 20. The bifurcated post portion 28 includes a slightly enlarged head portion 32 with an outer arcuate ridge 33 at its top end, the functions of which will be explained hereinafter. The post member 12 is preferably made of a thermoplastic material which can be manufactured easily and at reduced cost by conventional insert injection molding techniques. As a result, the opposed sides of the bifurcated post portion 28 are formed so as to be resiliently movable toward each other when compressed radially inwardly.

Figure 4:
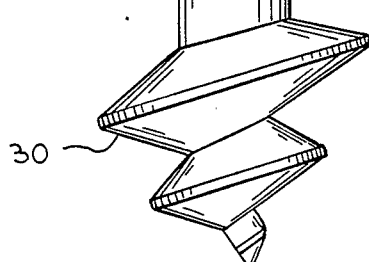
FIG. 4 is a cross-sectional view of the bottom latching ring-mat member of FIG. 1, taken along the lines 4—4.
Figure 4:
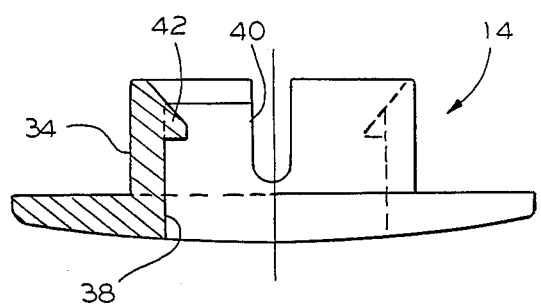
Figure 5:
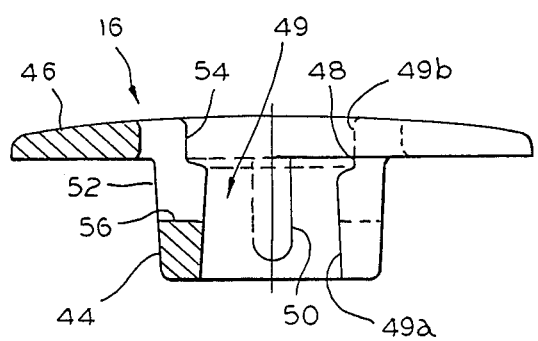
FIG. 5 is a cross-sectional view of the top latching ring-mat member of FIG. 1, taken along the lines 5—5.
Figure 6:
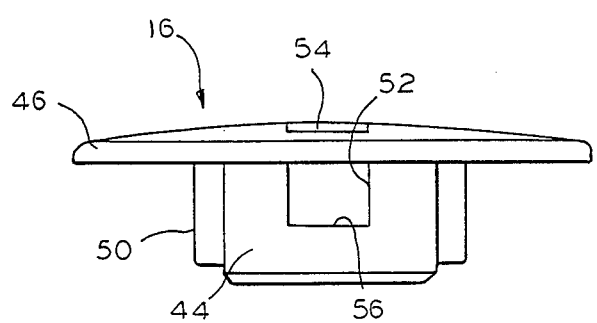
FIG. 6 is a side elevational view of the top latching ring-mat member of FIG. 1, taken along the lines direction of the arrow 6.

With reference to FIGS. 1, 2 and 4 of the drawings, the bottom latching ring-mat member 14 is comprised of a bifurcated tubular-shaped section 34 and a lower annular flange 36. The tubular-shaped section 34 includes an axial passageway or opening 38 through which extends the latching post member 12 and the top latching ring-mat member 16. The lower surface of the annular flange 36 is adapted to abut the upper surface of the circular flange 26 of post member 12 when assembled. The tubular-shaped section 34 includes diametrically opposed U-shaped slots 40 and a pair of opposed downwardly sloping tabs 42. The opposed sloping tabs 42 are disposed on the inner surface of the tubular-shaped section 34 and are arranged within a plane which is disposed perpendicular to a plane containing the U-shaped slots 40. The bottom member 14 is also preferably made of a thermoplastic material.

In FIGS. 1, 2, 5 and 6, the top latching ring-mat member 16 includes a tubular-shaped section 44 and an upper annular flange 46 joined to the tubular-shaped section 44 at a radial shoulder 48. The top latching member 16 includes an axial opening 49 defining an eyelet which is adapted to receive the post member 12. The axial opening 49 includes a first aperture 49a formed within the tubular-shaped section 44 and a second aperture 49b formed within the upper annular flange 46 defining the radial shoulder 48 therebetween. The tubular-shaped section 44 is formed with diametrically opposed raised ribs 50 extending longitudinally upon its outer surface. The top latching member 16 further includes a pair of opposed L-shaped cut-outs 52. The L-shaped cut-outs 52 are defined by and extend between vertical surfaces 54 formed within the upper annular flange 46 and horizontal surfaces 56 formed within the tubular-shaped section 44. The top member 16 is also preferably made of a thermoplastic material.

The car-mat fastener 10 is illustrated in the process of being assembled in FIG. 1, and FIG. 2 depicts the car-mat fastener in the fully assembled condition. The bottom latching ring-mat member 14 is first inserted through the grommet 24, which is fixed within the corner of the car-mat 22, from the underneath side of the mat. Then, the tubular-shaped section 44 of the top latching member 16 is telescoped into the axial opening 38 of the bottom latching member 14 so that the raised ribs 50 are mated or received within the U-shaped slots 40. The top latching member 16 is pushed downwardly in the direction of arrow A until the tabs 42 of the bottom latching member are snapped over and come to rest upon the horizontal surfaces 56 of the tubular-shaped section 44. As a result, the top and bottom members are permanently secured together sandwiching the car-mat therebetween and forming the eyelet 49 therethrough. As can be seen from FIG. 2, the car-mat 22 is trapped between the respective upper and lower flanges 46, 36. It should be understood that this procedure is repeated for the other corner of the car-mat.

Next, the latching post member 12 is permanently secured at an appropriate location in the car carpet, such as by threading the auger portion 30 into the car carpet. It will be noted that the car carpet 20 is retained beneath the lower surface of the circular flange 26 by means of the threaded engagement of the auger portion 30 therewith. Finally, the post portion 28 of the post member is inserted into the eyelet 49 created by means of the top and bottom latching members. As the post member 12 is pushed upwardly in the direction of arrow B, the opposed sides of the post portion 28 are radially inwardly compressed by means of the tubular-shaped section 44 of the top latching member 16 so as to cause the sections of portion 28 to move radially inwardly. This permits the head portion 32 to pass through the first aperture 49a so that the outer arcuate ridge 33 thereof is allowed to become detachably engaged with the radial shoulder 48 formed adjacent the second aperture 49b. As can be seen in FIG. 2, the car-mat fastener 10 has a relatively low profile in which the head portion 32 is substantially flush with the upper flange 46.

In order to remove the car-mat 22 from the car carpet 20 for the purpose of cleaning or the like, the corners of the car-mat 22 are simply grasped between the thumb and index finger and then lifted with an upward force. As a consequence, the post portion 28 with head portion 32 is again compressed by radially inwardly by means of the tubular-shaped section 44 of the top latching member 16, causing the arcuate ridge 33 to become disengaged from the radial shoulder 48. Then, the post portion 28 of the latching post member 12 will be able to pass through the eyelet 49, thereby separating the post member 12 from the car-mat 22 sandwiched between the top and bottom latching members.

From the foregoing detailed description, it can thus be seen that the present invention provides a car-mat fastener for removably securing a car-mat to a car carpet which is of a simple construction so as to permit a quick and easy installation, and yet permits the removal of the car-mat without the use of any tools or equipment. The car-mat fastener of the present invention is formed of a latching post member, a bottom latching ring-mat member, and a top latching ring-mat member, which are all formed preferably of a thermoplastic material.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A car-mat fastener for removably retaining a car-mat to a car carpet, said fastener comprising:

a latching post member consisting of a central flange separating an upper bifurcated post portion and a lower projecting portion, said lower projecting portion being adapted for fixed attachment to a car carpet, said post portion having a slightly enlarged head portion formed with an outer arcuate ridge;

a bottom latching ring-mat member consisting of a first bifurcated tubular-shaped section and a lower annular flange, said bottom latching member having a first axial opening for receiving a top latching ring-mat member, said first tubular-shaped section having diametrically opposed U-shaped slots and a pair of opposed tabs, said opposed tabs being formed on an inner surface of said first tubular-shaped section and being disposed perpendicularly to said U-shaped slots;

said top latching ring-mat member consisting of a second tubular-shaped section and an upper annular flange, said top latching member having an axial opening extending therethrough, said axial opening including a first aperture formed in said second tubular-shaped section and a second aperture formed in said upper annular flange defining a radial shoulder therebetween, said second tubular-shaped section having diametrically opposed raised ribs extending longitudinally on its outer surface, said top latching member having a pair of opposed L-shaped cut-outs disposed perpendicularly to said raised ribs;

said second tubular-shaped section of said top latching member being telescoped into the first axial opening in the first tubular-shaped section of said bottom latching member so that said raised ribs mate with said U-shaped slots and said tabs are permanently secured into said L-shaped cut-outs, said top and bottom latching members sandwiching the car-mat between the upper and lower flanges and forming an eyelet therebetween; and said post portion of said latching post member being inserted into said eyelet so as to cause the opposed sides thereof to be compressed by said second tubular-shaped section of said top latching member, said head portion being passed through the first aperture so that the arcuate ridge is allowed to become detachably engaged with said radial shoulder formed adjacent the second aperture.

2. A car-mat fastener as claimed in claim 1, wherein said lower projecting portion of said latching post member is formed of an auger to permit screwing of said post member into the car carpet.

3. A car-mat fastener as claimed in claim 1, wherein said latching post member is formed of a thermoplastic material.

4. A car-mat fastener as claimed in claim 1, wherein said bottom latching ring-mat member is formed of a thermoplastic material.

5. A car-mat fastener as claimed in claim 1, wherein said top latching ring-mat member is formed of a thermoplastic material.

6. A car-mat fastener as claimed in claim 1, wherein said latching post member, bottom latching ring-member and top latching ring-member are all made of a thermoplastic material.

7. A car-mat fastener for removably retaining a car-mat to a car carpet, said fastener comprising:

a latching post member consisting of a central flange separating an upper bifurcated post portion and a lower projecting portion, said lower projecting portion being adapted for fixed attachment to a car carpet, said post portion having a slightly enlarged head portion formed with an outer arcuate ridge;

a bottom latching ring-mat member consisting of a first bifurcated tubular-shaped section and a lower annular flange, said bottom latching member having a first axial opening for receiving a top latching ring-mat member, said first tubular-shaped section having a pair of opposed tabs formed on its inner surface thereof;

said top latching ring-mat member consisting of a second tubular-shaped section and an upper annular flange, said top latching member having a second axial opening extending therethrough, said second axial opening including a first aperture formed in said second tubular-shaped section and a second aperture formed in said upper annular flange defining a radial shoulder therebetween, said top latching member having a pair of opposed L-shaped cut-outs;

said second tubular section of said top latching member being telescoped into the first axial opening in the first tubular section of said bottom latching member so that said tabs are permanently secured into said L-shaped cut-outs, said top and bottom latching members sandwiching the car-mat between the upper and lower flanges and forming an eyelet therebetween; and said post position of said latching post member being inserted into said eyelet so as to cause the opposed sides thereof to be compressed by said second tubular-shaped section of said top latching member, said head portion being passed through the first aperture so that the arcuate ridge is allowed to become detachably engaged with said radial shoulder formed adjacent the second aperture.

8. A car-mat fastener as claimed in claim 7, wherein said lower projecting portion of said latching post member is formed of an auger to permit screwing of said post member into the car carpet.

9. A car-mat fastener as claimed in claim 7, wherein said latching post member is formed of a thermoplastic material.

10. A car-mat fastener as claimed in claim 7, wherein said bottom latching ring-mat member is formed of a thermoplastic material.

11. A car-mat fastener as claimed in claim 7, wherein said top latching ring-mat member is formed of a thermoplastic material.

12. A car-mat fastener as claimed in claim 7, wherein said latching post member, bottom latching ring-member and top latching ring-member are all made of a thermoplastic material.

13. A car-mat fastener for removably securing a car-mat to a car carpet, said fastener comprising:

ring-mat means formed of an upper member and a lower member for sandwiching a car-mat therebetween;

said upper member including an upper flange portion and a dependent tubular body portion fixed to an undersurface portion of said upper flange portion;

said lower member including a lower flange portion and an upstanding tubular body portion fixed to an upper surface portion of said lower flange portion;

means defined upon said upper and lower members for lockingly engaging said upper and lower members together wherein said dependent tubular body portion of said upper member is disposed within said upstanding tubular body portion of said lower member so as to form an eyelet assembly, and wherein said undersurface portion of said upper flange portion of said upper member is disposed so as to be engaged with an upper surface portion of said car-mat while said upper surface portion of said lower flange portion of said lower member is disposed so as to be engaged with an undersurface portion of said car-mat;

post member means formed of a lower projecting portion for fixed attachment to said car carpet and an upper post portion for insertion through said eyelet assembly of said upper and lower members; and means defined upon said upper post portion of said post member means and said eyelet assembly for detachably engaging said post member means with said eyelet assembly.

14. A car-mat fastener as claimed in claim 13, wherein said lower projecting portion of said post member means is formed of an auger so as to permit screwing of said post member means into said car carpet.

15. A car-mat fastener as claimed in claim 13, wherein said post member means is formed of a thermoplastic material.

16. A car-mat fastener as claimed in claim 13, wherein said lower ring-mat member means is formed of a thermoplastic material.

17. A car-mat fastener as claimed in claim 13, wherein said upper ring-mat member is formed of a thermoplastic material.

18. A car-mat fastener as claimed in claim 13, wherein said post member means, bottom lower ring-member and upper ring-member are all made of a thermoplastic material.

19. The fastener as set forth in claim 13, wherein said lockingly engaging means of said upper and lower members comprises:
   axially extending ribs and recess means defined upon said dependent tubular body portion of said upper member; and
   axially extending slot means for matingly engaging with said axially extending ribs of said upper member, and locking tabs for lockingly engaging with said recess means of said upper member, provided upon said upstanding tubular body portion of said lower member.

20. The fastener as set forth in claim 19, wherein:
   said axially extending ribs and slot means, and said recess means and said locking tabs, are disposed in mutually perpendicular planes.

* * * * *